United States Patent
Kikkawa et al.

(10) Patent No.: US 8,240,454 B2
(45) Date of Patent: Aug. 14, 2012

(54) MACHINING FACILITY USING SUB-PALLET

(75) Inventors: Yasuhiko Kikkawa, Yamanashi (JP);
Masahiro Shirone, Yamanashi (JP);
Yasuo Sudo, Kanagawa (JP); Aritomo Sasaki, Kanagawa (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 618 days.

(21) Appl. No.: 12/439,725

(22) PCT Filed: Sep. 5, 2006

(86) PCT No.: PCT/JP2006/317932
§ 371 (c)(1),
(2), (4) Date: Mar. 3, 2009

(87) PCT Pub. No.: WO2008/029486
PCT Pub. Date: Mar. 13, 2008

(65) Prior Publication Data
US 2010/0018836 A1  Jan. 28, 2010

(51) Int. Cl.
*B65G 37/00* (2006.01)
(52) U.S. Cl. .......... 198/347.3; 29/563; 29/33 P
(58) Field of Classification Search ........... 198/346.1; 29/563, 33 P
See application file for complete search history.

(56) References Cited

U.S. PATENT DOCUMENTS

| | | | | |
|---|---|---|---|---|
| 4,832,170 A * | 5/1989 | Takeuchi et al. | ........... | 198/346.1 |
| 7,437,810 B2 * | 10/2008 | Ota | ................ | 29/33 P |
| 7,490,710 B1 * | 2/2009 | Weskamp et al. | ........... | 198/345.3 |
| 7,621,031 B2 * | 11/2009 | Kawai et al. | .................. | 29/33 P |
| 7,665,197 B2 * | 2/2010 | Smolarek | ...................... | 29/33 P |
| 7,694,799 B2 * | 4/2010 | Bae | .......................... | 198/346.1 |
| 7,726,460 B2 * | 6/2010 | Neebe et al. | ................ | 198/346.1 |
| 2002/0050439 A1 * | 5/2002 | Watanabe et al. | ........... | 198/346.1 |
| 2002/0060127 A1 * | 5/2002 | Okuyama | .................. | 198/346.1 |
| 2006/0151287 A1 * | 7/2006 | Bae | ............................ | 198/346.1 |

FOREIGN PATENT DOCUMENTS

| | | |
|---|---|---|
| JP | 59-107839 A | 6/1984 |
| JP | 60-11736 | 1/1985 |
| JP | 63089249 | 4/1988 |
| JP | 63229239 | 9/1988 |
| JP | 3-51545 B2 | 8/1991 |
| JP | 5-46834 Y2 | 12/1993 |
| JP | 08252738 A | 1/1996 |
| JP | 08252783 A | 10/1996 |
| JP | 09309038 A | 12/1997 |
| JP | 11300567 A | 11/1999 |
| JP | 2005288651 A | 10/2005 |
| WO | 2006059398 | 6/2006 |

* cited by examiner

*Primary Examiner* — Mark A Deuble
(74) *Attorney, Agent, or Firm* — Paul & Paul

(57) ABSTRACT

Provided is a flexible machining facility using a sub-pallet, which can quickly satisfy the increasing or decreasing of units or other required specifications. It The machining facility includes a machine tool (1) having a pallet changer (47) for changing main pallets (39), a plurality of sub-pallets (3) for a workpiece to be mounted thereon, a setup station (5) for carrying the sub-pallet (3) and mounting and dismounting a workpiece on and from the sub-pallet (3), a sub-pallet stocker (7) for carrying the sub-pallet (3) thereon, and a sub-pallet conveyor system (9) for conveying the sub-pallet (3) and configured to include sub-pallet carrying parts of the machine tool (1), setup station (5), and sub-pallet stocker (7) in a workable area thereof. The sub-pallet (3) can be used to convey and machine a workpiece.

10 Claims, 10 Drawing Sheets

MACHINING FACILITY USING SUB-PALLET

TECHNICAL FIELD

The present invention relates to a machining facility which has a sub-pallet for mounting a workpiece thereon and conveys the sub-pallet between units provided with sub-pallet carrying parts.

The "units" in the specification refer to the machine tools, setup station, sub-pallet stockers, cleaning station, inspection station, and other main components forming a part of a machining facility. Further, a "main pallet" refers to a pallet which is detachably mounted on a pallet mounting table of a machine tool by a pallet changer. This main pallet is sometimes also provided with a mounting fixture such as an angle plate or a rotary cable. A "sub-pallet" is a pallet on which a workpiece is mounted and which is detachably mounted on a sub-pallet carrying part of a main pallet or a mounting fixture such as an angle plate or rotary table provided on a main pallet.

BACKGROUND ART

A machining facility called a "machining system" or a "machining cell" is a system for conveying and changing workpieces between at least one machine tool, such as machining center, lathe, grinding machine or electro-discharge machine, and a workpiece placing location called a "setup station" or "stocker" so as to facilitate machining of workpieces. There is the method of using a robot or a manipulator to directly convey workpieces or convey pallets having workpieces mounted thereon.

Japanese unexamined Parent Publication No. 59-107833 discloses a handling robot which loads and unloads a workpiece between a spindle of a lathe and a conveyor unit and performs the loading and unloading of the workpiece on and from the lathe automatically.

Japanese Patent Publication (B2) No. 3-51545 discloses a pallet conveying robot which conveys a pallet having a workpiece mounted thereon between a workpiece station and a table of a machine tool. In the past, a robot having one arm was used to grip an old pallet mounted on a table of a machine tool and convey it to a workpiece station, then grip a new pallet on the workpiece station and convey and mount it to the table of the machine tool. Therefore, the conveyance efficiency was poor. However, this invention solves this problem and enables a plurality of pallets to be efficiently conveyed.

Japanese Utility Model Publication No. 5-46834 discloses a setup system for enabling a sub-pallet having a workpiece mounted thereon to be automatically mounted and dismounted on and from a main pallet and feeding and discharging workpieces to a main pallet conveyor system. In the past, a workpiece was mounted and dismounted on and from an angle plate on a main pallet, and therefore the efficiency of the setup work was poor. However, this invention solves this problem and enables workpieces set-up in advance to be automatically mounted on angle plates in the setup station and thereby improves the work efficiency.

In the prior art described in Japanese Unexamined Patent Publication No. 59-107839, the body of a handling robot is fixed to a base of a lathe and the motion of the arm about three rotational axes and the motion along one linear movement axis can be used to convey and mount a workpiece, placed on a conveyor unit facing upward, on a horizontally oriented spindle of the lathe while changing the direction. Further, it is possible to reverse the orientation of the workpiece and mount it on the spindle. At the front end of the arm, it is possible to detachably mount two or more types of hands which can be changed according to the shape and weight of the workplaces. In this mode, since the workpiece is directly gripped by the robot hand and workpieces come in various shapes and sizes, it is necessary to change two or more types of hands. Therefore, there is the problem that it is necessary to prepare a plurality of hands and prepare a plurality of hand operating programs.

The pallet conveying robot of the prior art described in Japanese Patent Publication (B2) No. 3-51545 has a swiveling member, rotating member, sliding member, and a pair of independently swivelable arms (first arm and second arm). It discloses a configuration wherein motion about four rotational axes and motion along one linear movement axis are used to grip a pallet of a workpiece station placed in a state with the workpiece mounting surface of the pallet facing upward by one arm, grip a pallet mounted on the table of the machine tool in a state with the workpiece mounting surface of the pallet facing sideways by the other arm, simultaneously convey the two pallets while changing the orientations of the pallets, and then change the pallets. This pallet conveying robot conveys a pallet to be mounted and dismounted on and from a table of a machine tool, that is, a main pallet, and the workpieces are directly mounted on the main pallets. When a main pallet is large in size or when a main pallet has an angle plate or rotary table mounted on it, even if the workpiece is small in size, the weight conveyed by the robot becomes larger. This being the case, there is the problem that the conveying robot also becomes larger in size.

The prior art described in Japanese Utility Model Publication No. 5-46834 is configured by providing a setup station, which can convey, invert, and rock a main pallet, between a main pallet conveyor system (pallet pool line) attached to a machine tool and a sub-pallet conveyor system making a sub-pallet roll and slide in the horizontal state sub-pallet conveyor line). An angle plate is fixed to the main pallet, the sub-pallet mounting surface of the angle plate is matched in height with the sub-pallet rolling and sliding surface of the sub-pallet conveyor line, and a slide operation is used to dismount an old sub-pallet from the angle plate and mount a new sub-pallet on the angle plate. The main pallet having a new sub-pallet mounted on the angle plate is then inverted and returned to the pallet pool line. This invention conveys the main pallet to the sub-pallet conveyor line and mounts and dismounts sub-pallets on and from the main pallet. This invention is configured such that the sub-pallet just slides on the sub-pallet conveyor line and a setup system conveys, inverts and rocks the main pallet in order to mount the sub-pallet on the main pallet. That is, there is the problem that the setup system becomes large in size.

DISCLOSURE OF THE INVENTION

The present invention is directed to solve the problems in the prior art and an object of the present invention is to provide a flexible machining facility using a sub-pallet, which can quickly satisfy required specifications such as the increasing or decreasing of machine tools, setup stations, sub-pallet stockers, cleaning stations, and other units, carry the sub-pallet with the workpiece mounting surface of the sub-pallet facing upward or sideways, and quickly position a sub-pallet gripper of a sub-pallet conveyor system and a sub-pallet carrying part of each unit.

Another object thereof is to provide a machining facility using a sub-pallet, which can easily remove chips and coolant solution attached on the sub-pallet or workpiece.

Another object thereof is to provide a machining facility using a sub-pallet, which enables fast conveyance of a workpiece and a reduction of size of a conveyor system by conveying a sub-pallet, lighter than a main, pallet rather than conveying a main pallet when mounting and dismounting the sub-pallet for the workpiece to be mounted thereon on and from a machine tool.

To achieve these objects, according to the present invention, there is provided a machining facility having a sub-pallet for a workpiece to be mounted thereon and conveying the sub-pallet between units provided with sub-pallet carrying parts, which includes: at least one machine tool having a pallet changer for changing main pallets; a plurality of sub-pallets for a workpiece to be mounted thereon, formed no be able to be mounted on a sub-pallet carrying part provided on said main pallet; a setup station for mounting and dismounting a workpiece on and from said sub-pallet, the setup station having a sub-pallet carrying part for carrying the sub-pallet thereon; and a sub-pallet conveyor system for conveying the pallet, the sub-pallet conveyor system configured to include the sub-pallet carrying parts of the machine tool and the setup station in a workable area thereof, wherein the said sub-pallet is used to convey and machine a workpiece. This machining facility mounts and dismounts the workpiece on and from the sub-pallet at the setup station and conveys the sub-pallet, by the sub-pallet conveyor system, to the machine tool having the main pallet changer.

Further, according to the present invention, there is provided a machining facility, which further includes a sub-pallet stocker having a sub-pallet carrying part for carrying the sub-pallet thereon and installed so as to include the sub-pallet carrying part in the workable area of the sub-pallet conveyor system. This machining facility further includes the sub-pallet stocker as a unit and can load and unload the sub-pallet into and from the sub-pallet stocker by the sub-pallet conveyor system.

Further, according to the present invention, there is provided a machining facility, which further includes a cleaning station for removing chips and coolant solution attached on the sub-pallet and the workpiece, the cleaning station having a sub-pallet carrying part for carrying the sub-pallet thereon and installed so as to include the sub-pallet carrying part in the workable area of the sub-pallet conveyor system. This machining facility further includes the cleaning station as a unit, and the sub-pallet and workpiece loaded into the cleaning station are cleaned of the chips and coolant solution.

Further, according to the present invention, there is provided a machining facility, in which said sub-pallet conveyor system has a hand for gripping the sub-pallet. This sub-pallet conveyor system has the hand and uses this hand to grip the sub-pallet.

Further, according to the present invention, there is provided a machining facility having a sub-pallet for a workpiece to be mounted thereon and conveying the sub-pallet between units provided with sub-pallet carrying parts, which includes: at least one machine tool having a pallet changer for changing main pallets; a plurality of sub-pallets for a workpiece to be mounted thereon, formed to be able to be mounted on a sub-pallet carrying part provided on said main pallets; a setup station for mounting and dismounting a workpiece on and from the sub-pallet, the setup station having a sub-pallet carrying part for carrying the sub-pallet; a sub-pallet stocker having a sub-pallet carrying part for carrying the sub-pallet thereon and configured to stock the sub-pallet at a slant so that chips and coolant solution will, drop off when the sub-pallet is carried on the sub-pallet stocker; and a sub-pallet conveyor system for conveying the sub-pallet, the sub-pallet conveyor system having a hand for gripping the sub-pallet and configured to include the sub-pallet carrying parts of the machine tool, the setup station and the sub-pallet stocker in a workable area thereof, wherein the sub-pallet; is used to convey and machine a workpiece. This sub-pallet stocker is configured to stock the sub-pallet at a slant, and therefore the chips and coolant sol union attached on the sub-pallet and workpiece stocked after machined by the machine tool easily drop off.

Further, according to the present invention, there is provided a machining facility having a sub-pallet for a workpiece to be mounted thereon and conveying the sub-pallet between units provided with sub-pallet carrying parts, which includes: at least one machine tool having a pallet changer for changing main pallets; a plurality of sub-pallets for workpieces to be mounted thereon, formed to be able to be mounted on a sub-pallet carrying part provided on the main pallet; a sub-pallet stocker having a sub-pallet carrying part for carrying the sub-pallet thereon and configured to stock the sub-pallet at a slant so that chips and coolant solution will drop off when the sub-pallet is carried on the sub-pallet stocker; and a sub-pallet conveyor system for conveying the sub-pallet, the sub-pallet conveyor system having a hand for gripping the sub-pallet and configured to include the sub-pallet carrying parts of the machine tool and the sub-pallet stocker in a workable area thereof, wherein the sub-pallet is used to convey and machine a workpiece. This machining facility is a machining facility not provided with a setup station, in which workpieces may be mounted and dismounted on and from the sub-pallets at the sub-pallet stocker or workpieces may be mounted and dismounted on and from the sub-pallets at other work tables.

Further, according to the present: invention, there is provided a machining facility having a sub-pallet for a workpiece to be mounted thereon and conveying the sub-pallet between units provided with sub-pallet carrying parts, which includes: at least one machine tool including a base supporting machine components, a spindle having a tool mounted thereon, a spindle head rotatably supporting the spindle, a main pallet provided with a sub-pallet carrying part for carrying thereon a sub-pallet for a workpiece to be mounted thereon, a pallet changer for changing main pallets between a machining area and a machining preparation area, a driving means for relatively moving the spindle head along X-, Y-, and Z-axes with respect to the main pallet, and a detecting means for detecting positions or movement amounts of feed axes operated by the driving means; a plurality of sub-pallets for workpieces to be mounted thereon, formed to be able to be mounted on a sub-pallet carrying part provided on the main pallet or a table of the machine tool; a setup station for mounting and dismounting a workpiece on and from the sub-pallet, the setup station having a sub-pallet carrying part for carrying the sub-pallet thereon; a sub-pallet stocker including a sub-pallet carrying table having a sub-pallet carrying part for carrying the sub-pallet thereon, a positioning means provided on the sub-pallet carrying table and engaging with and positioning the sub-pallet, and an oil pan for receiving dropped chips and coolant solution; and a sub-pallet conveyor system for conveying the sub-pallet between the units, the sub-pallet conveyor system configured to include the sub-pallet carrying parts of the machine tool, the setup station and the sub-pallet stocker in a workable area thereof, wherein the sub-pallet is used to convey and machine a workpiece. The machine tool constituting one unit of this machining facility is a machining center type in which the tool is mounted on the rotating spindle and is moved relative to the main pallet along the X-, Y-, and Z-axes. This machine tool has the pallet changer for changing the main pallet between the machining area and the machining preparation area. Further, in the sub-pallet stocker, positioning means is used to position the sub-pallet on the sub-pallet carrying table and the dropped chips and coolant solution are received and collected by the oil pan.

Further, according to the present invention, there is provided a machining facility in which the sub-pallet conveyor system is a multi-articulated conveyor system having at least five swiveling axes. Since the conveyor system is the multi-articulated conveyor system, it is possible to convey the sub-pallet to any position in the workable area of the sub-pallet conveyor system, and further change the orientation of the sub-pallet or slant the workpiece mounting surface of the sub-pallet.

Further, according to the present invention, there is provided a machining facility in which the setup station has a sub-pallet carrying part for carrying the sub-pallet thereon with a workpiece mounting surface facing upward and in which the machine tool has a sub-pallet carrying part for carrying the sub-pallet thereon with the workpiece mounting surface of the sub-pallet facing sideways. The setup work can be performed at this setup station with the workpiece mounting surface of the sub-pallet facing upward, while the sub-pallet can be conveyed after the orientation thereof is changed so that the workpiece mounting surface of the sub-pallets are turned sideways for machining with good discharge of the chips at the machine tool.

Further, according to the present invention, there is provided a machining facility in which the unit provided with the sub-pallet carrying part has a reference mark of known relative position coordinates with respect to the sub-pallet carrying part of the unit and in which the sub-pallet conveyor system has an image recognizing means for recognizing an image of the reference mark, so that the recognized image of the reference mark and a position information of the sub-pallet conveyor system is used to position a gripper of the sub-pallet conveyor system and the sub-pallet carrying part of the unit. In this machining facility, the cross or other reference mark, is made the unit having sub-pallet carrying part, such as the machine tool, setup station and sub-pallet stocker, and is recognized by image recognizing means provided en the sub-pallet conveyor system to read the position, information of the sub-pallet conveyor system at that time. Since the relative position coordinates of the reference mark and the sub-pallet carrying part of the unit are known, it is possible to automatically position the gripper of the sub-pallet conveyor system and the sub-pallet carrying part of the unit relative to each other when recognizing the image of a reference mark.

Further, according to the present invention, there is provided a machining facility in which the sub-pallet conveyor system has a weight measuring means for measuring a weight of a gripped article or a shape measuring means for measuring a shape of a gripped article, so that the result of measurement of the weight or shape is compared with predetermined numerical values to judge that mistaken mounting of the workpiece has been made. In this machining facility, the measured weight value or dimension value is compared with the predetermined weight reference value or dimension reference value and, when exceeding the predetermined value, it is judged that the mistaken mounting of the workpiece has been made.

Further, according to the present invention, there is provided a machining facility which further includes a cleaning tool for removing chips and coolant solution attached on the sub-pallet and the workpiece, the cleaning tool having a gripped part gripped by a gripper of the sub-pallet conveyor system. The sub-pallet conveyor system of this machining facility grips a cleaning tool instead of the sub-pallet by the gripper, moves the cleaning tool near the sub-pallet mounted on the sub-pallet carrying part of each unit, and removes the chips and coolant solution attached on the sub-pallet and the workpiece by blowing air, suction, brushing, etc.

Further, according to the present invention, there is provided a machining facility having a sub-pallet for a workpiece to be mounted thereon and conveying the sub-pallet between units provided with sub-pallet carrying parts, which includes: at least one machine tool having a pallet changer for changing main pallets; a plurality of sub-pallets for a workpiece to be mounted thereon, formed to be able to be mounted on a sub-pallet carrying part provided on the main pallet; a setup station for mounting and dismounting a workpiece on and from the sub-pallet, the setup station having a sub-pallet carrying part for carrying the sub-pallet thereon; a sub-pallet stocker having a sub-pallet carrying part for carrying the sub-pallet thereon; a cleaning station for removing chips and coolant solution attached on the sub-pallet and the workpiece, the cleaning station having a sub-pallet carrying part for carrying the sub-pallet thereon and including a sub-pallet swiveling mechanism for making the sub-pallet turn; and a sub-pallet conveyor system for conveying the sub-pallet and driving the swiveling mechanism of the cleaning station, the sub-pallet conveyor system having a hand for gripping the sub-pallet and configured to include the sub-pallet carrying parts of the machine tool, the setup station, the sub-pallet stocker and the cleaning station in a workable area thereof, wherein the sub-pallet is used to convey and machine a workpiece. At the cleaning station of this machining facility, a sub-pallet having the machined sub-pallet mounted thereon is mounted on the sub-pallet mounting part and then the attached chips and coolant solution is removed by spraying a cleaning coolant solution, blowing air, suction, brushing, etc. while turning the sub-pallet.

Further, according to the present invention, there is provided a machining facility having a sub-pallet for a workpiece to be mounted thereon and conveying the sub-pallet between, units provided with sub-pallet carrying parts, which includes: at least one machine tool including a base supporting machine components, a spindle having a tool, mounted thereon, a spindle head rotatably supporting the spindle, a main pallet or table provided with a sub-pallet carrying part for carrying thereon a sub-pallet for a workpiece to be mounted thereon, a driving means for relatively moving the spindle head along X-, Y-, and Z-axes with respect to the main pallet or the table, and a detecting means for detecting positions or movement amounts of feed axes operated by the driving means, a plurality of sub-pallets for a workpiece to be mounted thereon, formed to be able to be mounted on a sub-pallet carrying part provided on the main pallet or the table of the machine tool; a setup station for mounting and dismounting a workpiece on and from the sub-pallet, the setup station having a sub-pallet carrying part for carrying the sub-pallet thereon; a sub-pallet stocker including a sub-pallet carrying table having a sub-pallet carrying part for carrying the sub-pallet thereon, a positioning means provided on the sub-pallet carrying table and engaging with and positioning the sub-pallet, and an oil pan for receiving dropped chips and coolant; and a multi-articulated sub-pallet conveyor system for conveying the sub-pallet between the units, the sub-pallet conveyor system having at least five swiveling axes and configured to include the sub-pallet carrying parts of the machine tool, the setup station and the sub-pallet stocker in a workable area thereof, wherein the sub-pallet is used to convey and machine a workpiece. The machine tool of this machining facility can mount the sub-pallet conveyed by the sub-pallet conveyor system and machine it even without including the main pallet changer if having the sub-pallet carrying part on the table or the angle plate or rotary table provided on the table.

Further, according to the present invention, there is provided a machine tool machining a workpiece by moving a tool and the workpiece mounted on a sub-pallet relative to each other, which includes: a pallet changer for changing main pallets; a pallet mounting table moving relatively to a spindle head having the tool mounted thereon along X-, Y-, and Z-axes and having a shaft for making the main pallet turn; and a sub-pallet mounting means for mounting the sub-pallet for a workpiece to be mounted thereon on a sub-pallet carrying part provided on the main pallet, wherein a workpiece conveyed using the main pallet and the sub-pallet is machined. In this machine tool, the sub-pallet having the workpiece mounted thereon is mounted on the sub-pallet carrying part provided on the main pallet and the workpiece conveyed using the main pallet and the sub-pallet is machined.

Further, according to the present invention, there is provided a machine tool machining a workpiece by moving a tool and the workpiece mounted on a sub-pallet relative to each other, which includes: a pallet changer for changing main pallets; a pallet mounting table moving relatively to a spindle head having the tool mounted thereon along X-, Y-, and Z-axes and having a shaft for making the main pallet turn; a rotary table for the sub-pallet to be mounted thereon, the rotary table provided on the main pallet; and a sub-pallet mounting means for mounting the sub-pallet for a workpiece to be mounted thereon on the rotary table, the sub-pallet mounting means provided on the rotary table, wherein, a workpiece conveyed using the main pallet and the sub-pallet is machined. This machine tool further includes the rotary table on the rotatable main pallet and, by mounting the sub-pallet having the workpiece mounted thereon on the sub-pallet carrying part of the rotary table, can machine the workpiece using five axes, that is, three axes of linear motion and two axes of rotation.

Further, according to the present invention, there is provided a setup station for carrying a sub-pallet thereon and mounting and dismounting a workpiece on and from the sub-pallets, which includes: a sub-pallet carrying table having a sub-pallet carrying part for carrying the sub-pallet thereon with a workpiece mounting surface of the sub-pallet facing upward; a positioning means provided on the sub-pallet carrying table and engaging with and positioning the sub-pallet; and an indexing means for turning and indexing the sub-pallet carrying table. The sub-pallet carried on this setup station is positioned on the sub-pallet carrying table and suitably rotationally indexed by the indexing means, and the setup work including the mounting and dismounting of the workpiece is performed on the indexed sub-pallet.

Further, according to the present invention, there is provided a sub-pallet stocker for carrying thereon a sub-pallet having a workpiece to be mounted thereon, which includes: a sub-pallet carrying table having a sub-pallet carrying part for carrying the sub-pallet thereon; a positioning means provided on the sub-pallet carrying table and engaging with and positioning the sub-pallet; and a reference mark provided at a predetermined position of the sub-pallet stocker and having known relative position coordinates with respect to the sub-pallet carrying part. Since this sub-pallet stocker is provided with the reference mark of known relative position, coordinates with respect to the sub-pallet carrying part, when used in a machining facility, it is possible to recognize the image of the reference mark by the image recognizing means provided in the sub-pallet conveyor system and automatically position the gripper of the sub-pallet conveyor system and the sub-pallet carrying part.

Further, according to the present invention, there is provided a sub-pallet stocker for carrying thereon a sub-pallet having a workpiece to be mounted thereon, which includes: a sub-pallet carrying cable having a sub-pallet carrying part for carrying thereon the sub-pallet at a slant so that chips and coolant solution will drop off; a positioning means provided on the sub-pallet carrying table and engaging with and positioning the sub-pallet; and an oil pan for receiving the dropped chips and coolant solution. Since this sub-pallet stocker carries and positions the sub-pallet at a slant, the chips and coolant solution attached on the sub-pallet and workpiece carried after machining easily drop into the oil pan.

Further, according to the present invention, there is provided a sub-pallet for a workpiece to be mounted thereon, mounted on a machine tool, which includes: a workpiece mounting surface for a workpiece to be mounted thereon; a mounted part formed to be able to be mounted on a sub-pallet carrying part provided on a main pallet changed by a pallet changer of the machine tool; and a gripped part for being gripped by a sub-pallet conveyor system when conveying the sub-pallet, wherein the sub-pallet is used to mount and convey a workpiece. This sub-pallet, on which the workpiece is mounted, can be gripped by the sub-pallet conveyor system, and is mounted on the sub-pallet carrying part provided on the main pallet.

Further, according to the present invention, there is provided a sub-pallet for a workpiece to be mounted thereon, mounted on a machine tool, which includes: a workpiece mounting surface for a workpiece to be mounted thereon; a mounted part formed to be able to be mounted on a sub-pallet carrying part provided on a main pallet changed by a pallet changer of the machine tool; a gripped part for being gripped by a sub-pallet conveyor system when conveying the sub-pallet; and a suction hole communicated with an air suction pipe extending to a main pallet of the machine tool and opening to the workpiece mounting surface so that the mounted surface of the workpiece mounted using a workpiece mounting means is sucked to the workpiece mounting surface, wherein the sub-pallet is used, to mount and convey a workpiece. When this sub-pallet is mounted on the main pallet of the machine tool, the mounted surface of the mounted workpiece is sucked through the suction pipe and suction hole and made to closely contact with the workpiece mounting surface of the sub-pallet.

Further, according to the present invention, there is provided a sub-pallet for a workpiece to be mounted thereon, mounted on a machine tool, which includes: a workpiece mounting surface for a workpiece to be mounted thereon; a mounted means formed to be able to be mounted on a sub-pallet carrying part provided on a main pallet changed by a pallet changer of the machine tool; and a handle attached to the sub-pallet in a state projecting from a side surface, wherein the sub-pallet is used to mount and convey a workpiece. In a machining facility which does not include a sub-pallet conveyor system or in a machining facility in which a sub-pallet conveyor system breaks down, the operator can grip the handle of the sub-pallet to convey the sub-pallet among the machine tool, setup station, sub-pallet stocker, and other units.

According to the present invention, a common sub-pallet carrying part on which a sub-pallet can be carried, is provided on a machining tool, setup station, sub-pallet stocker, cleaning station, etc., to form a unit, and a desired machining facility can be quickly constructed by increasing or decreasing the units in accordance with the required specifications of the machining facility, and quickly construct a machining facility. If using as the sub-pallet conveyor system a multi-articulated conveyor system having at least five swiveling axes, it is possible to move a sub-pallet to any position in a work area of the conveyor system and possible to change the orientation of the workpiece mounting surface of the sub-pallet, slant it, or otherwise give diverse motion. In this way, by forming units, using sub-pallets, etc., it is possible to construct a machining facility using a sub-pallet with flexibility.

Further, since the sub-pallet stocker is designed to store the sub-pallet at a slant, the chips or coolant solution attached on the sub-pallet and workpiece easily drop off. Further, it becomes possible to automatically removing the chips or coolant solution attached on the sub-pallet and workpiece by using the sub-pallet conveyor system to grip the cleaning tool and perform the cleaning operation or providing the cleaning station with the sub-pallet swiveling mechanism able to be driven by the sub-pallet conveyor system.

Further, since the workpieces are changed by mounting the workpieces on the sub-pallets and conveying the sub-pallets among the machine tool, setup station and other units, it is possible to quickly convey the workpieces and reduce the size of the conveyor system compared with the case where the workpieces are changed by conveying main pallets.

BEST MODE FOR CARRYING OUT THE INVENTION

Preferred embodiments of the present invention will be described below with reference to the accompanying drawings.

Figure 1:
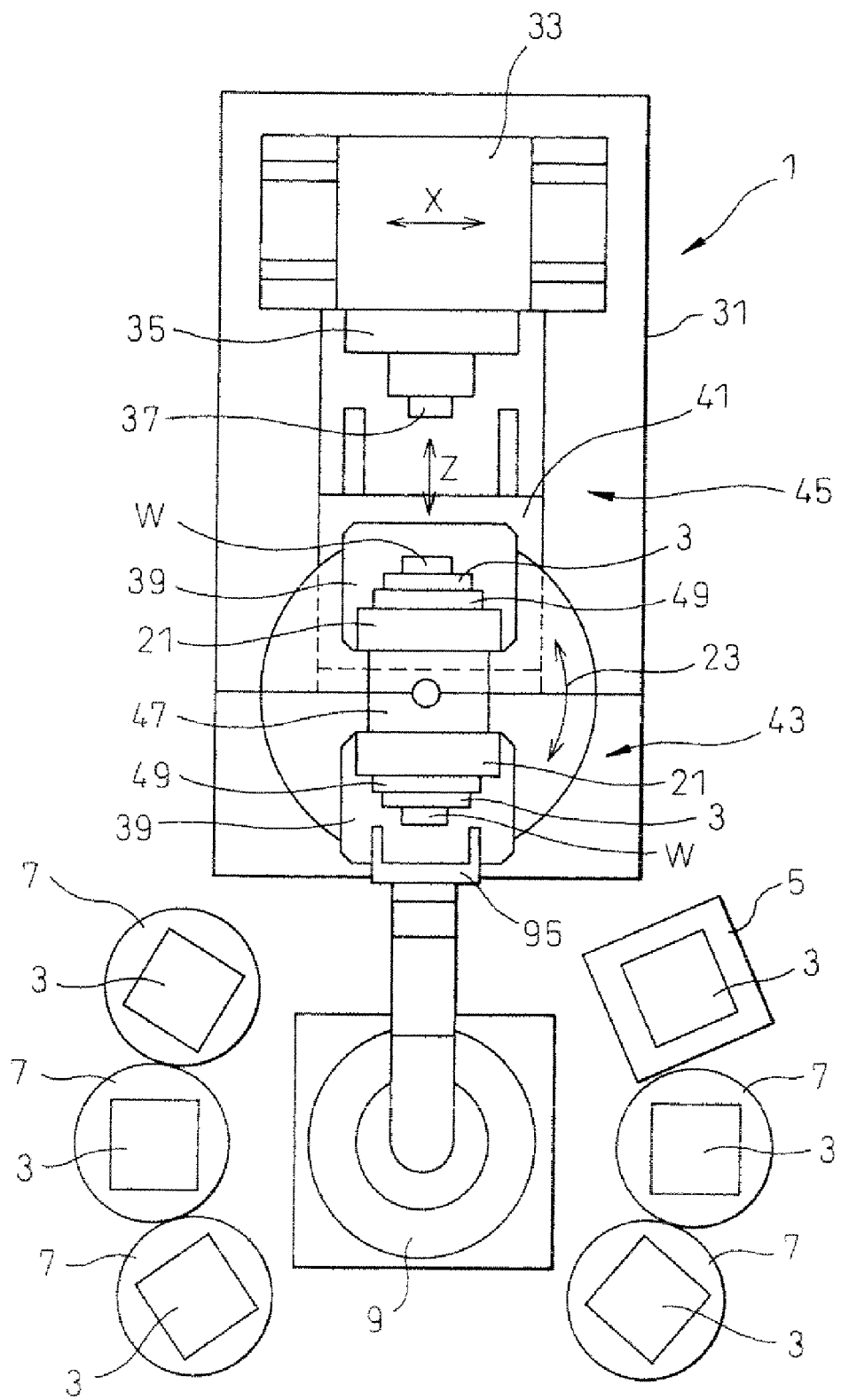
FIG. 1 is a plan view showing a first embodiment of a machining facility according to the present invention, which includes one machine tool.

In FIG. 1, the machining facility of the first embodiment is comprised of a machine tool 1 constituted by a horizontal machining center, one setup station 5 where a workpiece is mounted and dismounted on and from a sub-pallet 3, five sub-pallet stockers 7 for sub-pallets 3 to be placed thereon, and a sub-pallet conveyor system 9 conveying sub-pallet 3 among units, i.e., machine tool 1, setup station 5, and sub-pallet stockers 7.

Machine tool 1 is a horizontal machining center and includes a column 33 moving on a bed 31 constituting a base in the direction along an X-axis, i.e., the left-right direction, a spindle head 35 moving on column 33 in the direction along a Z-axis, i.e., the up-down direction (direction vertical to paper surface), a spindle 37 supported rotatably by spindle head 35 and mounting a tool at the front end thereof, a pallet mounting table 41 moving on bed 31 in the direction along the Z-axis, i.e., the front-back direction, and detachably mounting a main pallet 39, and a pallet changer 47 gripping main pallets 39 and making them turn simultaneously like in arrow 23 for change between a machining preparation area 43 where main pallet 39 is kept on standby and a machining area 45 in which pallet mounting table 41 is provided. Pallet mounting table 41 has a rotation shaft rotating in the direction along a B-axis and can make main pallet 39 rotate in the horizontal plane. Main pallet 39 has a rotary table body 21 provided thereon, and rotary table body 21 has attached thereto a rotary table 49 having a rotation shaft rotating in the direction along a C-axis. A sub-pallet 3 is detachably mounted on the vertical surface of rotary table 49. The detailed structure of a sub-pallet carrying part for mounting sub-pallet 3 on rotary table 49 will be described later. While not shown, the X-, Y-, and Z-feed axes are provided with driving means, and the positions or amounts of movement along the feed axes are detected by detecting means for positional control. Main pallet 39 may include, instead of rotary table body 21, an angle plate provided thereon, on which sub-pallet 3 is mounted. The sub-pallet may also be directly mounted on main pallet 39 without any angle plate.

At setup station 5, the workpiece is mounted on sub-pallet 3, and then sub-pallet 3 is gripped by a hand 95 of sub-pallet conveyor system 9 and mounted to rotary table 49 on main pallet 39 in the machining preparation area 43 of machine tool 1. Sub-pallet 3 in the machining preparation area 43 is moved by pallet changer 47 to pallet mounting table 41 in machining area 45, where workpiece W mounted on sub-pallet 3 is machined. Sub-pallet 3 having machined workpiece W mounted thereon is moved by pallet changer 47 from machining area 45 to machining preparation area 43 and is conveyed by sub-pallet conveyor system 9 to setup station 5. At setup station 5, machined workpiece W is dismounted from sub-pallet 3. Sub-pallet conveyor system 9 also conveys sub-pallet 3 between setup station 5 and sub-pallet stockers 7 and between machine tool 1 and sub-pallet stockers 7. This machining facility is controlled by a not shown computer.

Figure 2:
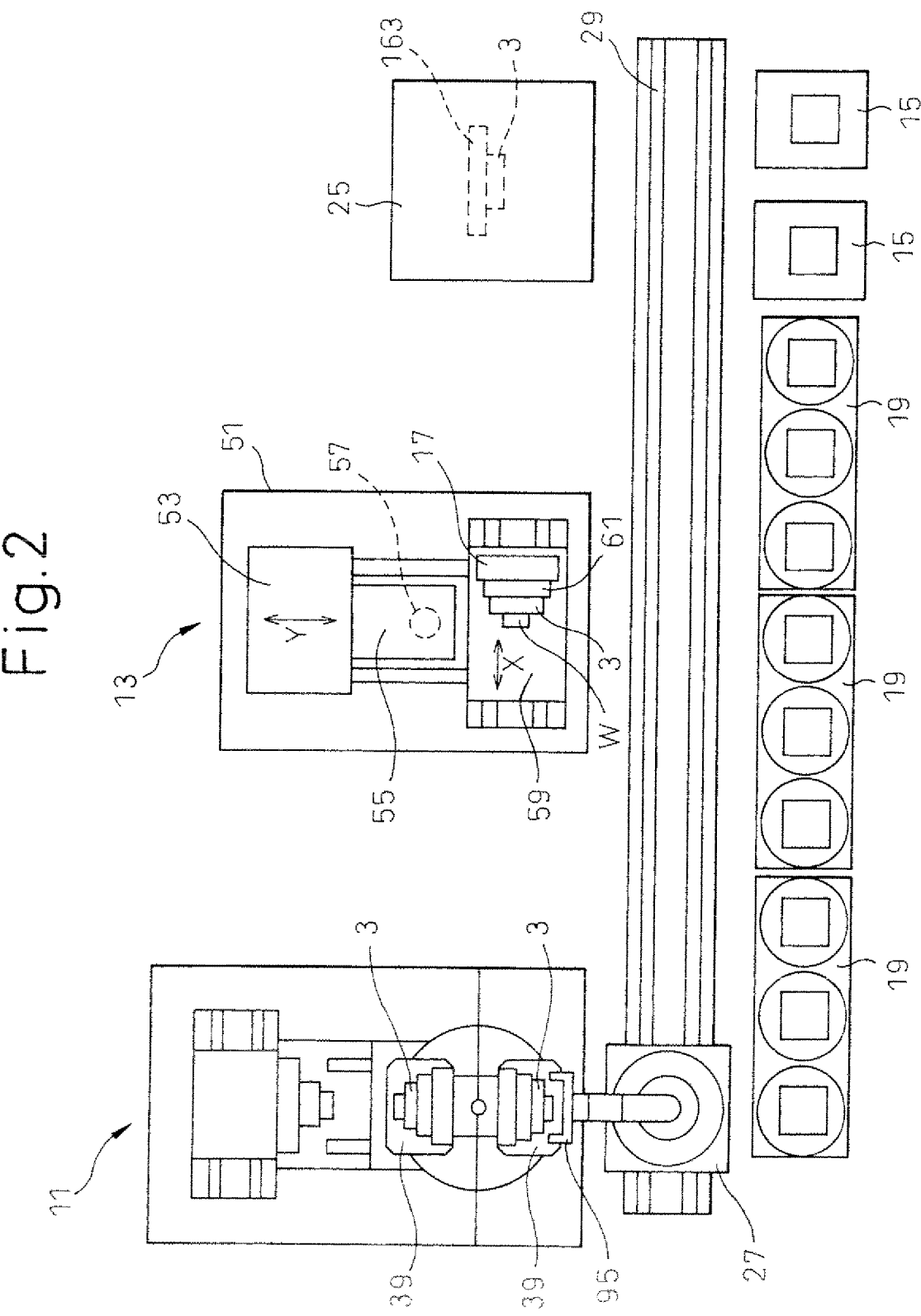
FIG. 2 is a plan view showing a second embodiment of a machining facility according to the present invention, which includes two machine tools and a self-propelled sub-pallet conveyor system.

In FIG. 2, the machining facility of the second embodiment is comprised of two machine tools, a machining tool 11 constituted by a horizontal machining center and a machine tool 13 constituted a vertical machining center, two setup stations 15 where workpieces are mounted and dismounted on and from sub-pallets 3, three sub-pallet stockers 19 each of which allows three sub-pallets 3 to be carried thereon, one cleaning station 25 into which sub-pallet 3 is put to remove attached chips and coolant solution, and a self-propelled sub-pallet conveyor system 27 conveying sub-pallet 3 among the units, i.e., machine tools 11 and 13, setup stations 15, sub-pallet stockers 19, and cleaning station 25.

Machine tool 11 has the same configuration as that of horizontal machining center 1 of FIG. 1, and therefore the explanation will be omitted. Machine tool 13 is a vertical machining center which includes a column 53 moving on a bed 51 constituting a base in the direction along a Y-axis, i.e., the front-rear direction, a spindle head 55 moving on column 53 in the direction along a Z-axis, i.e., the up-down direction (direction vertical to paper surface), a spindle 57 supported rotatably by spindle head 55 and mounting a tool on the bottom end thereof, and a table 59 moving on bed 51 in the direction along an X-axis, i.e., the left-right direction. Table 59 has a rotary table body 17 provided thereon, which in turn has a rotary table 61 rotating in the direction, along an A-axis. A sub-pallet 3 is detachable/mounted on the vertical surface of rotary table 61. The detailed structure of a sub-pallet carrying part mounting sub-pallet 3 on rotary table 61 will be described later.

In the machining facility of the second embodiment, sub-pallet conveyor system 27 can be self propelled and convey sub-pallet 3 between units installed in a broad area. Further, it is possible to perform a first process of machining on a workpiece W by machine tool 11 and then convey a sub-pallet 3 no machine tool 13, where a second process of machining is performed on the same workpiece W. After the machining, sub-pallet 3 can be conveyed to cleaning station 25 where chips and coolant solution attached to sub-pallet 3 or workpiece W are removed. In accordance with the number or type of workpieces W to be machined, it is also possible to increase the types or numbers of the machine tools and possible to form sub-pallet stockers 19 in multi-levels.

Figure 3:
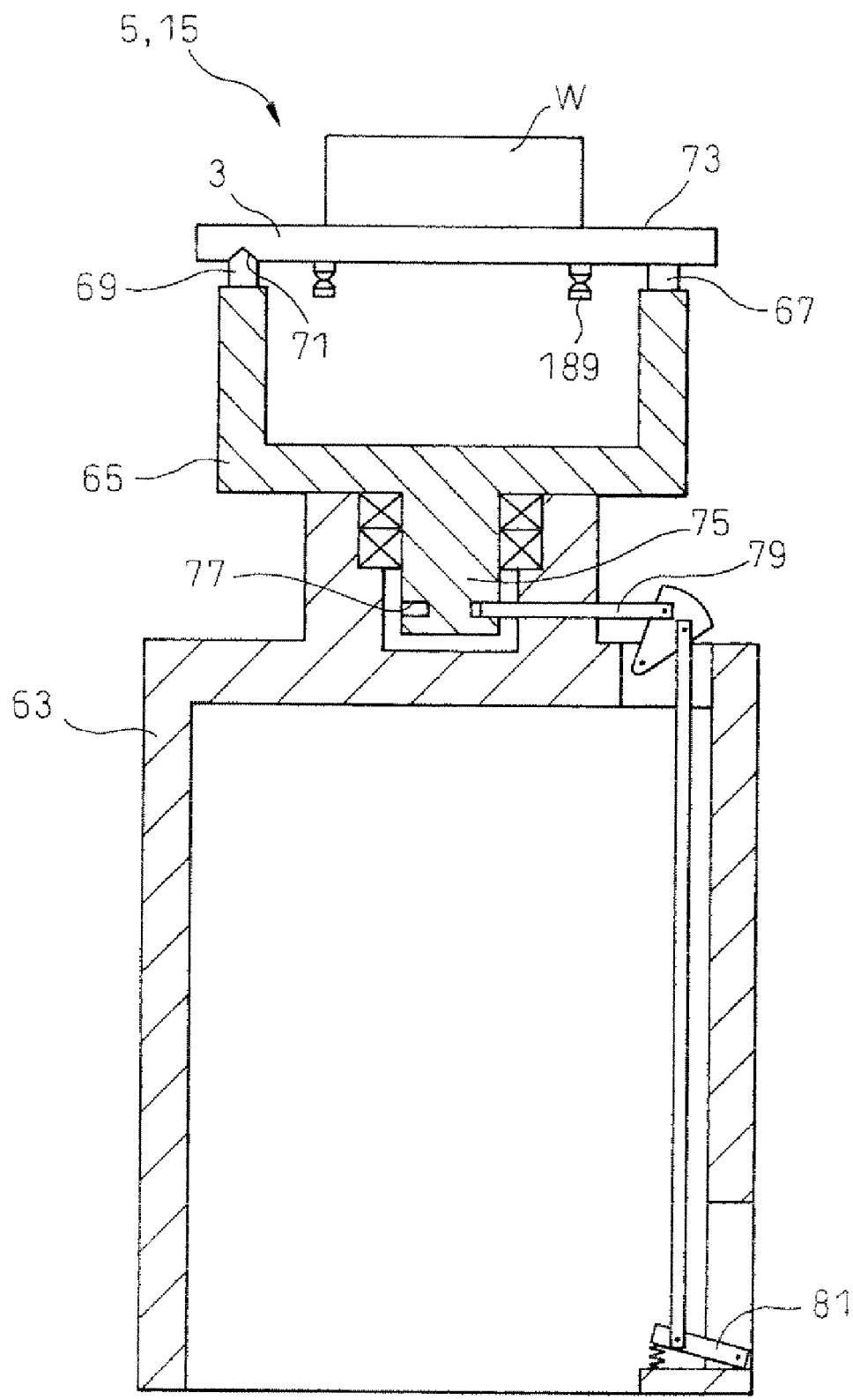
FIG. 3 is a cross-sectional view showing the configuration of a setup station.

In setup station 5, 15 of FIG. 3, a sub-pallet carrying table 65 is rotatably supported on the top of a base 63. Sub-pallet placing table 65 has a generally-angular U-shaped cross-section. Columnar positioning pins 67 limiting the position of sub-pallet 3 in the gravity direction are implanted at the four corners of the top surface, while conical positional pins 69 limiting the position of sub-pallet 3 in the horizontal direction are implanted at two diagonal corners. On the bottom surface of sub-pallet 3, conical holes 71 are formed at positions corresponding to positioning pins 69. When sub-pallet 3 is carried on sub-pallet carrying table 65, four positioning pins 67 support the bottom surface of sub-pallet 3 and two positioning pins 69 engage with holes 71 to thereby arrange sub-pallet 3 at a predetermined position with workpiece mounting surface 73 facing upward. Base 63 is provided with an indexing pin 79 to be inserted from the horizontal direction into any one of four indexing holes 77 formed, equidistantly at four locations on the circumference or a shaft part 75 projecting downward from sub-pallet carrying table 65. This indexing pin 79 is linked with a pedal 81 provided at the lower part of base 63. When an operator depresses pedal 81, indexing pin 79 is disengaged from indexing hole 77, sub-pallet carrying table 65 can be turned by hand, and the orientation of horizontal turning of sub-pallet 3 can be changed by 90 degree intervals, thereby facilitating the mounting work of workpiece W. Instead of horizontal turning, it is also possible to employ a configuration in which workpiece mounting surface 73 of sub-pallet 3 can be turned to slant to the operator side. For the method of mounting workpiece W to workpiece mounting surface 73, the method of inserting a hand from the cavity of sub-pallet carrying table 65 to insert a bolt in a through hole formed in sub-pallet 3 from the bottom side and screwing it into a tap hole formed at the bottom surface of workpiece W to fasten it is used. This method can be easily performed because sub-pallet 3 is thinner than main pallet 39 as shown in the figure. Of course, the method of using a fastener to mount workpiece W to workpiece mounting surface 73 from the side of workpiece mounting surface 73 by an ordinary method can be also employed, but sometimes the fastener and tool end up interfering.

Figure 4:
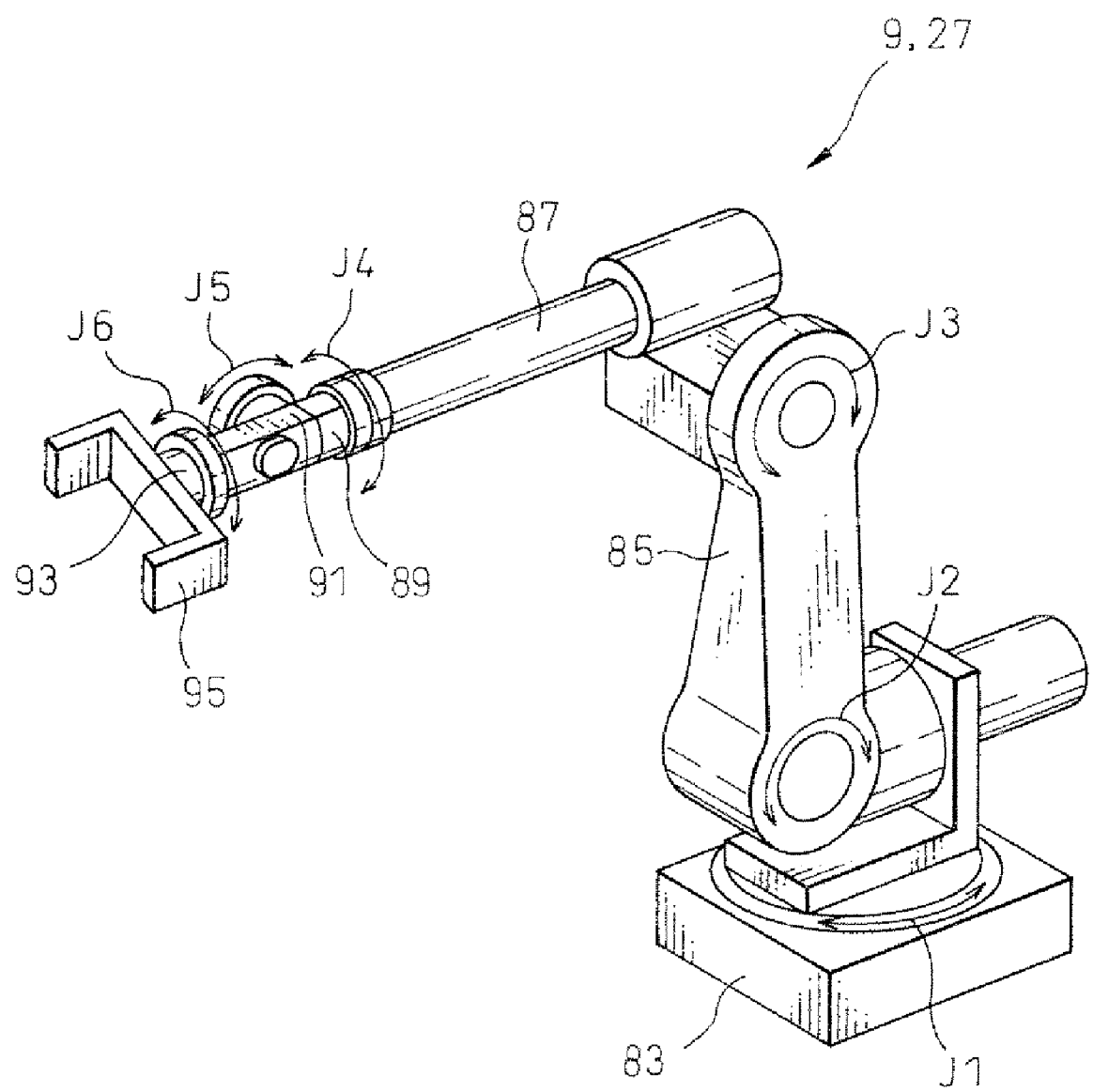
FIG. 4 is a perspective view showing the configuration of a sub-pallet conveyor system.

FIG. 4 shows, as a sub-pallet conveyor system, an embodiment of a multi-articulated conveyor system having at least five swiveling axes. In this embodiment, sub-pallet conveyor system 9, 27 has six swiveling axes J1 to J6, and a first arm 85, a second arm 87, a third arm 89, a fourth arm 91, and a front end 93 can turn on base 83. The "at least five swiveling axes" refer to J1 to J5. If providing a self propelling means under base 83, sub-pallet conveyor system 9, 27 can move on rails 29 laid on the floor surface as shown in FIG. 2 and the workable area is enlarged. Sub-pallet conveyor system 9, 27 is instructed to operate by teaching or programming and is controlled to be driven by a control system.

Figure 5:
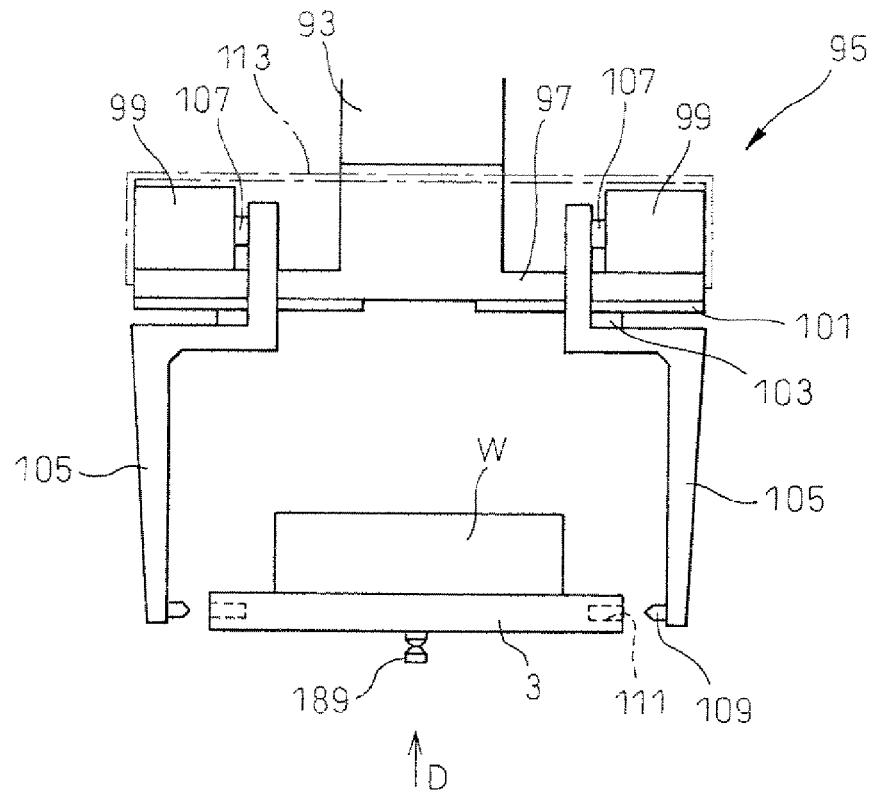
FIG. 5 is an explanatory view illustrating the state where a hand attached to the front end of an arm of the sub-pallet, conveyor system grips a sub-pallet.
Figure 6:
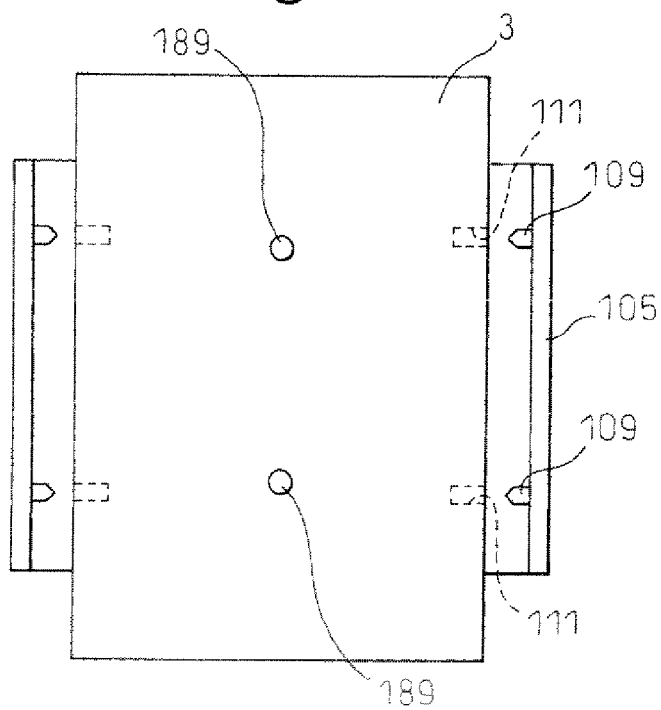
FIG. 6 is a bottom view, as viewed along the arrow D, of the hand and sub-pallet shown in FIG. 5.

In FIG. 5, hand 95 serving as a gripping means attached to front end 93 of sub-pallet conveyor system 9, 27 of FIG. 4 is provided with a pair of air cylinders 99 at the two ends of a base plate 97 attached to front end 93. Base plate 97 is provided with rails 101, so that a pair of fingers 105 can be moved linearly by sliders 103 so as to become closer or farther in distance. Fingers 105 are coupled to pistons 107 of air cylinders 99, and air cylinders 99 are controlled so that the pair of fingers 105 can synchronously make grippers 109 engage with and disengage from gripped parts 111 of sub-pallet 3. As shown in FIG. 6, two grippers 109 are provided at each finger 105 so as to project out from finger 105, while two gripped parts 111 are formed at each of two side surfaces of sub-pallet 3. The surroundings of base plate 97 are; covered by a cover 113.

Figure 7:
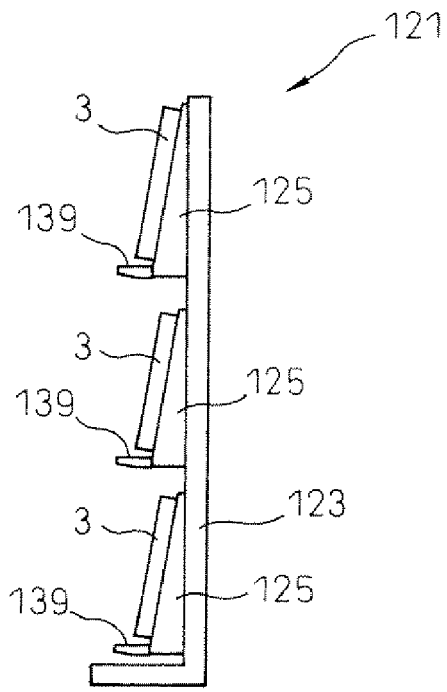
FIG. 7 is a side view showing the configuration of a sub-pallet stocker.
Figure 8:
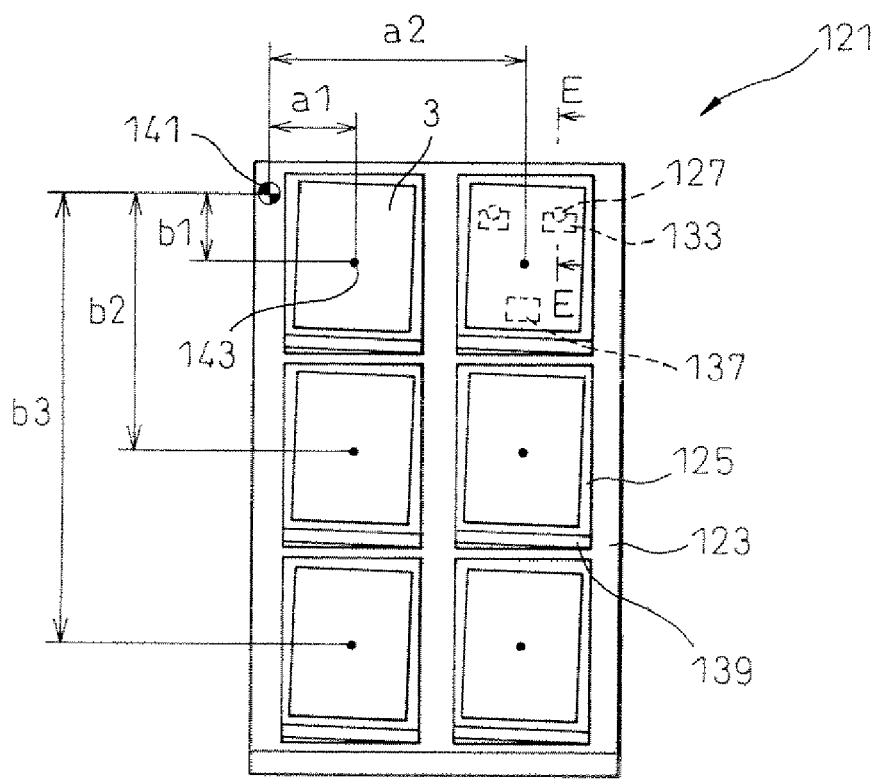
FIG. 8 is a front view showing the configuration of the sub-pallet stocker.

Sub-pallet stockers 7, 19 carry sub-pallets 3 with workpiece mounting surfaces 73 of sub-pallets 3 facing upward. As opposed to this, FIGS. 7 and 8 show a sub-pallet stocker 121 carrying sub-pallets 3 slanted in three levels and two columns so as to reduce the installation area. A frame 123 is provided with a total of six sub-pallet carrying tables 125 carrying sub-pallets 3 slanted in three levels, a top, middle, and bottom level and in two columns, a left and right column. Sub-pallets 3 are carried slanted down to the right slightly from the front view so as to help the attached coolant solution collect into one location and drop down. Below each sub-pallet carrying table 125, an oil pan 139 is provided so that it receives the chips and coolant solution dropping down from sub-pallet 3 and workpiece W. As shown in FIG. 7, if sub-pallet carrying tables 125 are provided slanted down to the right slightly, the coolant solution, received by oil pans 139 at the six locations will not remain still, but will be easily guided to the bottommost location and therefore can be easily collected.

Figure 9:
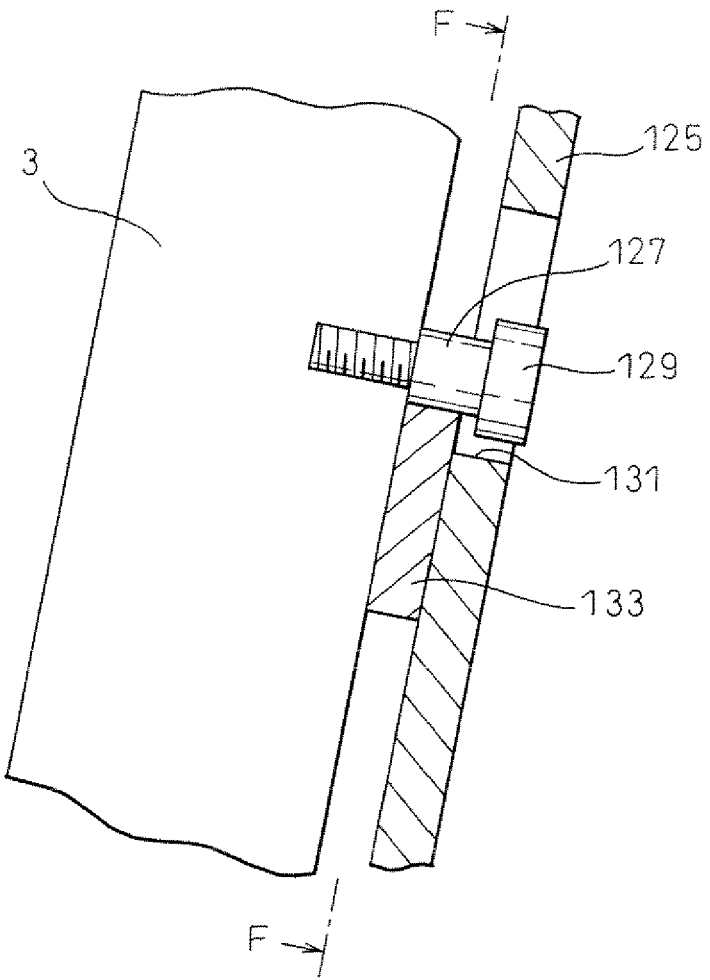
FIG. 9 is an enlarged cross-sectional view of a part E-E of FIG. 8.
Figure 10:
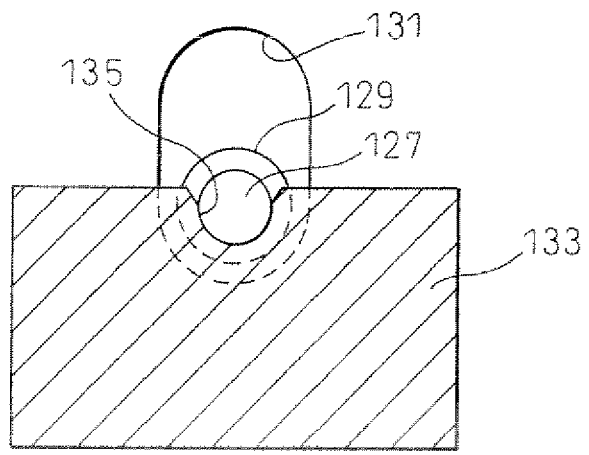
FIG. 10 is a cross-sectional view of the part F-F of FIG. 9.

On the top bottom surface of sub-pallet 3 carried on sub-pallet stocker 121, two pins 127 are provided so as to project out and spaced apart in the left-right directions. As shown in FIGS. 9 and 10, the front ends of pins 127 have large diameter parts 129. Each sub-pallet carrying table 125 is formed with elongated holes 131 at two locations corresponding to pins 127. Positioning plates 133 are fixed to sub-pallet carrying table 125 so as to cover the bottom, parts of elongated holes 131. Elongated holes 131 are sized to be somewhat larger than large diameter parts 129 of pins 127. Positioning plates 133 are formed with semicircular notch grooves 135 sized to be somewhat larger than the diameters of pins 127. An abutting plate 137 abutting against the center of the lower part of the bottom surface of sub-pallet 3 is fixed to sub-pallet carrying table 125. Pins 127 of Sub-pallet 3 gripped by hand 95 of sub-pallet conveyor system 9, 27 is inserted into elongated holes 131 in a posture substantially parallel to the slanted surface of sub-pallet carrying table 125 and then the pallet 3 is lowered until pins 127 engage with notch grooves 135. When the grip of hand 95 is released, sub-pallet 3 is carried on sub-pallet carrying table 125 using gravity so as not to fall off.

Further, a reference mark 141 is made at the top left of the frame of sub-pallet stocker 121, and relative position coordinates a1, a2, b1, b2, and b3 between the reference mark and center points 143 of sub-pallet carrying tables 125 are stored in advance in the control system for sub-pallet conveyor system 9, 27. Hand 95 of sub-pallet conveyor system 9, 27 is provided with a camera 145 as an image recognizing means (see FIG. 11), which recognizes the reference mark. Using the position information of sub-pallet conveyor system 9, 27 detected by position detectors or the like provided at the swiveling axes and propelling means of sub-pallet conveyor system 9, 27 when recognizing the reference mark and the stored positional, coordinates between the reference mark and center points 143 of sub-pallet carrying tables 125, grippers 109 of fingers 105 of sub-pallet conveyor system 9, 27 and gripped parts 111 of sub-pallet 3 carried on sub-pallet carrying table 125 of sub-pallet stocker 121 are automatically and quickly positioned. Due to this, the work of teaching the carrying positions of all sub-pallets 3 to sub-pallet conveyor system 9, 27 becomes unnecessary.

Reference marks 141 are preferably provided near the sub-pallet carrying parts of various units, i.e., the machine tool, setup station, and cleaning station, so that grippers 109 of fingers 105 of sub-pallet conveyor system 9, 27 and gripped parts 111 of sub-pallet 3 carried on each unit are positioned with respect to each other similarly.

Figure 11:
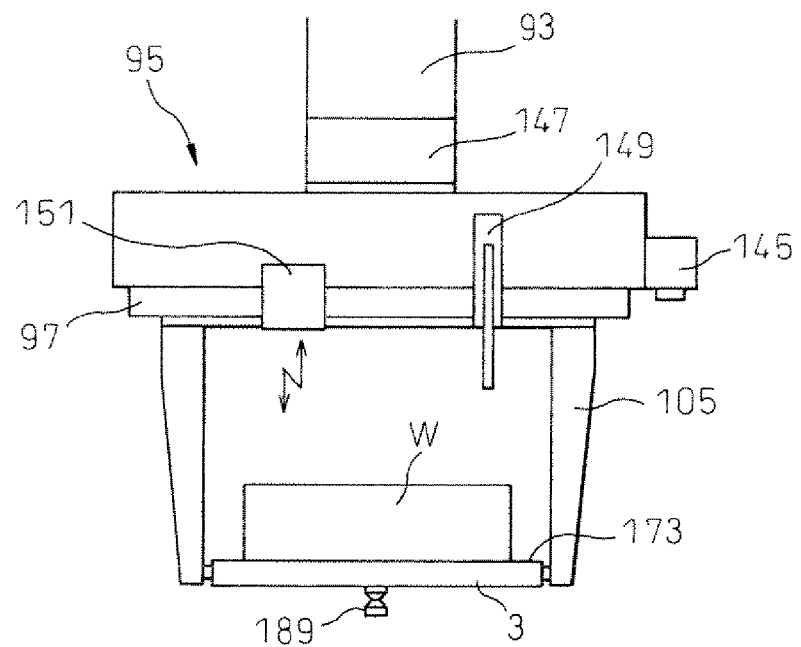
FIG. 11 is an explanatory view showing a configuration wherein a hand of a sub-pallet conveyor system is provided with an image recognizing means, weight measuring means, and shape measuring means.

In FIG. 11, by providing a load sensor or other weight measuring means 147 between front end 93 of sub-pallet conveyor system 9, 27 and hand 95, it is possible to measure the weight of workpiece W mounted on sub-pallet 3. The measurement value of the weight is compared with a predetermined weight value of workpiece W. When exceeding the acceptable range, the control system judges that mistaken mounting of the workpiece has been made and, for example, issues an alarm. Further, by providing base plate 97 of hand 95 with a contact-type shape measuring means 149 or non-contact type shape measuring means 151 faced toward workpiece mounting surface 73 of sub-pallet 3 to be gripped, it is possible to measure the shape and dimensions of workpiece W mounted on sub-pallet 3. The measurement values of the shape and dimensions are compared with the predetermined values of the shape and dimensions of workpiece W. When exceeding the acceptable range, the control system judges that mistaken mounting of the workpiece has been made and, for example, issues an alarm.

Figure 12:
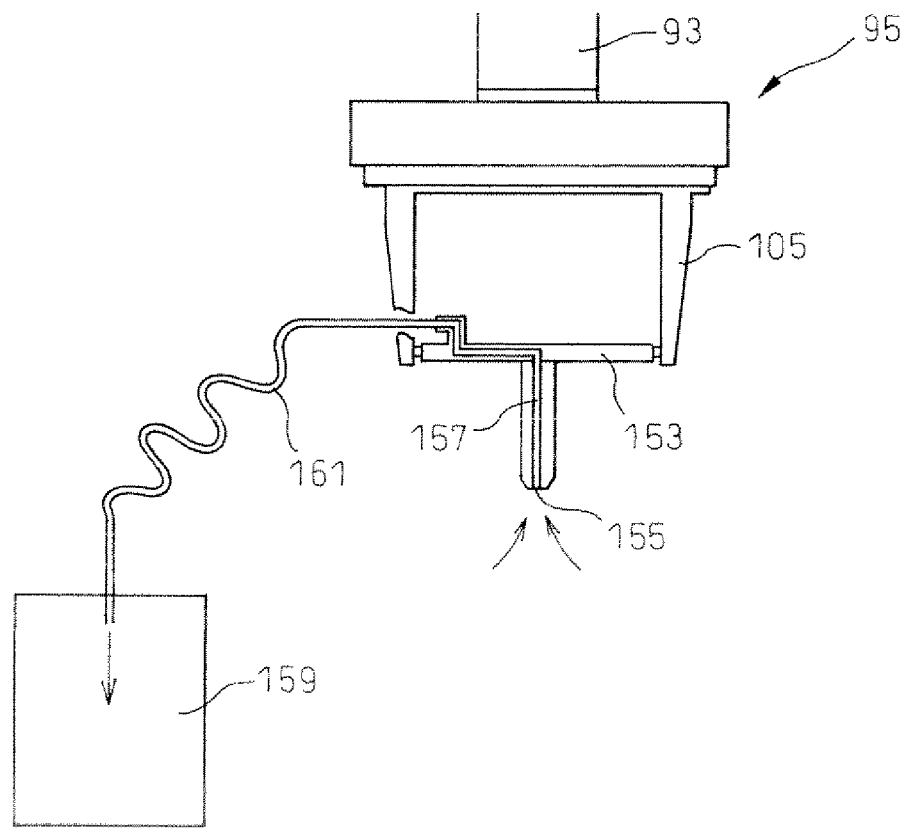
FIG. 12 is an explanatory view illustrating the case wherein the hand of the sub-pallet conveyor system is used to grip a cleaning tool.

In FIG. 12, hand 95 of sub-pallet conveyor system 9, 27 can grip, instead of sub-pallet 3, a cleaning tool 153 carried on a specific sub-pallet carrying table 125 of sub-pallet stocker 121. For this reason, cleaning tool 153 has gripped parts of dimensions substantially the same as sub-pallet 3 and has a suction port 155 and a suction pipe 157. The outlet of suction pipe 157 is connected to a separate suction system 159 by a flexible hose 161. Sub-pallet conveyor system 9, 27 appropriately grips cleaning tool 153 instead of sub-pallet 3 to bring its suction port 155 close to sub-pallet 3 and workpiece W placed on each of the units, i.e., the machine tool, setup station, and sub-pallet stocker, and removes the attached chips and coolant solution. If using an air blow system instead of suction system 159, the chips and the coolant solution can be blown off. Further, it is also possible to provide cleaning tool 153 with brush and use multi-articulated sub-pallet conveyor system 9, 27 to give the brush movement to remove the chips.

Figure 13:
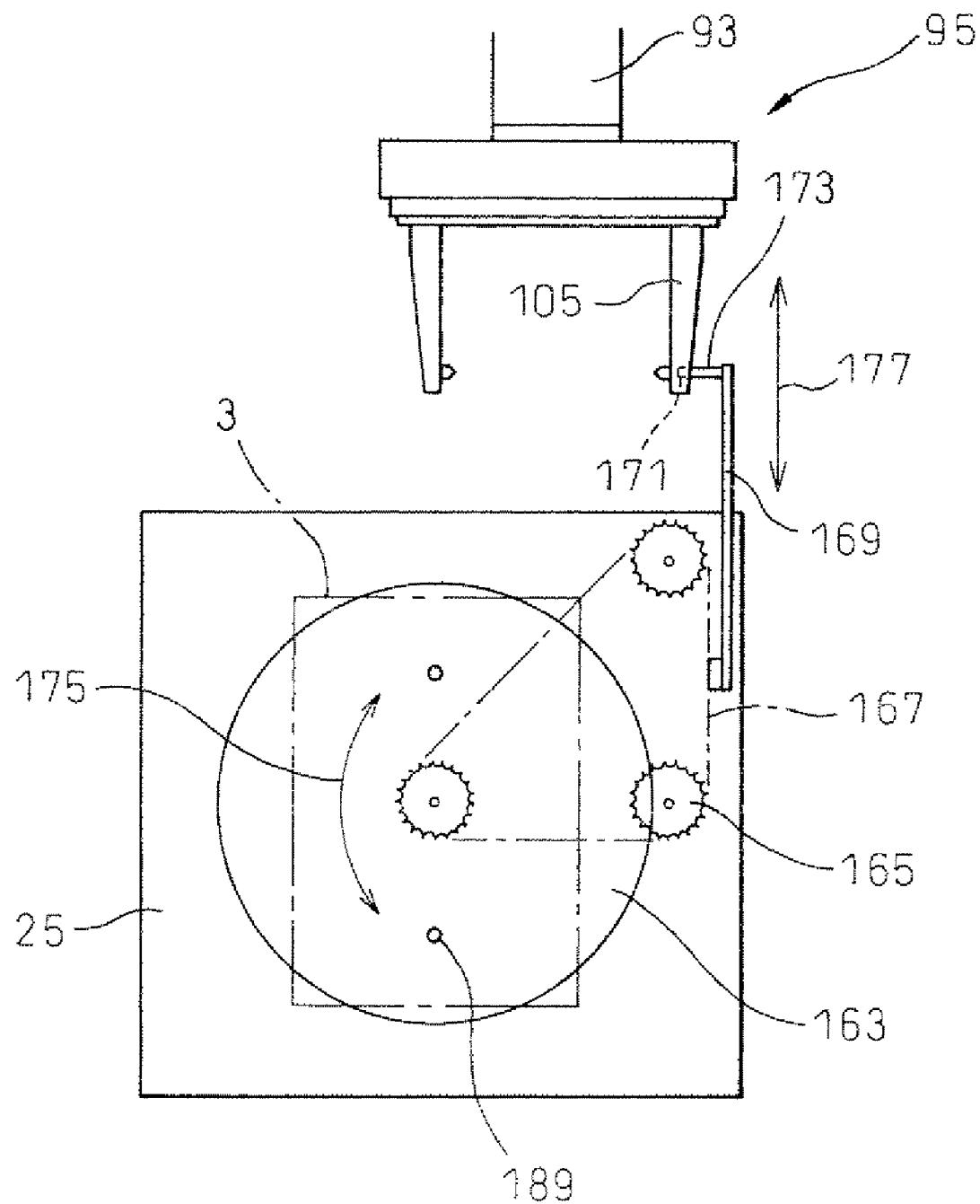
FIG. 13 is an explanatory view illustrating a configuration wherein a hand of a sub-pallet conveyor system is used to drive a sub-pallet swiveling mechanism of a cleaning station.

In FIG. 13, cleaning station 25 has a sub-pallet swiveling mechanism making the sub-pallet 3 mounted in the hermetically closed cover swivel back and forth as shown by an arrow 175. Sub-pallet swiveling mechanism is comprised of a rotary table 163 for sub-pallet 3 to be mounted thereon, rotatably supported on the frame of cleaning station 25, three sprockets 165 and a chain 167 for making rotary table 163 turn, and a rod 169 attached to the middle of chain 167 and extending through the upper cover. The top part of rod 169 has a conical projection 173 engaging with a hole 171 of finger 105 of sub-pallet conveyor system 9, 27. By moving hand 95 of sub-pallet conveyor system 9, 27 up and down, as shown by an arrow 177, with projection 173 inserted in hole 171, rotary table 163 swivels back and forth and, if necessary, a washing solution is sprayed in a shower state or air is blown, to remove the chips or coolant, solution attached on sub-pallet 3 and workpiece W. Further, the door of cleaning station 25 may also be opened and closed using the motion of sub-pallet conveyor system 9, 27.

Figure 14:
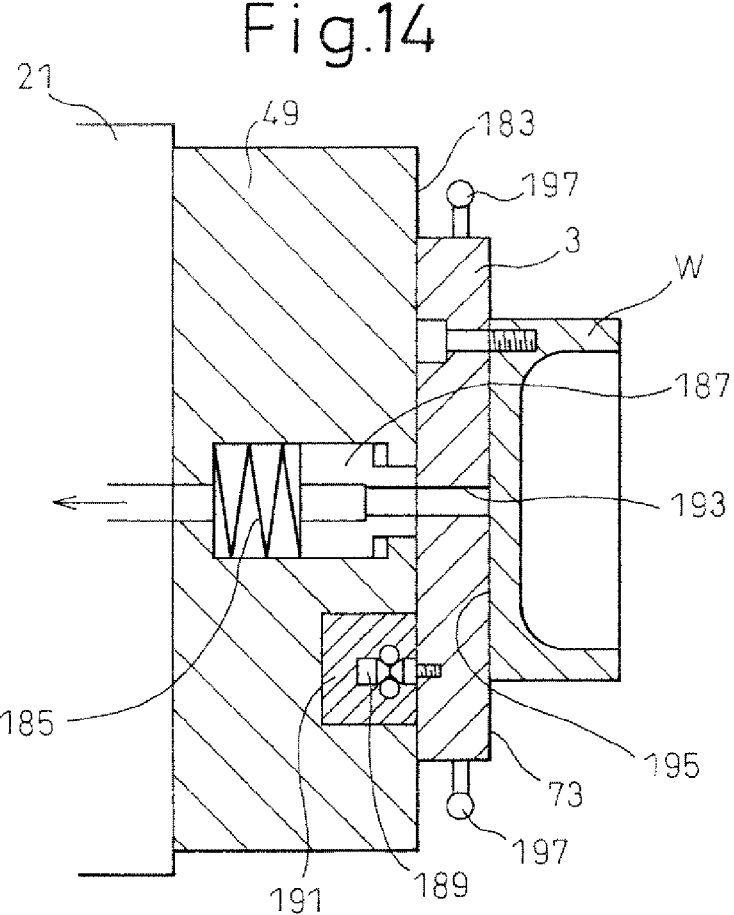
FIG. 14 is a cross-sectional view showing a configuration of a sub-pallet having a suction hole and handles.

In FIG. 14, rotary table 49 mounted on main pallet 39 is provided with an air suction pipe 181, and an abutting piece 187 is biased by a spring 185 so as to project out a little from mounting surface 183 of sub-pallet 3. By engagement of male side positioning clamp pins projecting from the bottom surface of sub-pallet 3 with female side positioning clamps 191 provided at two corresponding locations of rotary table 49, sub-pallet 3 is positioned and mounted on rotary table 49. For male side positioning clamp pins 189 and female side positioning clamps 191, it is possible to use a well-known combination of engagement of taper cones and taper holes as well as pull studs and collet chucks used between main pallet 39 and pallet mounting table 41 and also possible to use commercially available well-known positioning clamps. A suction hole 193 extends through sub-pallet 3 at a position corresponding to abutting piece 187, while a suction hole 193 communicates with suction pipe 181. A workpiece WA having a recessed cross-sectional shape is mounted to sub-pallet 3 by the method of using four bolts to pull sub-pallet 3 in from the bottom of sub-pallet 3. By sucking mounted surface 195 of workpiece W through suction hole 193, even during machining, it is possible to make mounted surface 195 of workpiece W closely contact with workpiece mounting surface 73 of sub-pallet 3.

Figure 15:
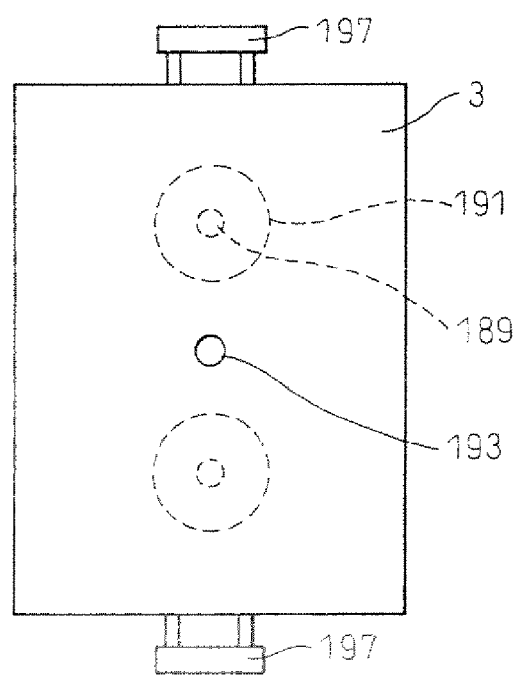
FIG. 15 is a front view of the sub-pallet shown in FIG. 14.

In FIGS. 14 and 15, the two side surfaces of sub-pallet 3 are provided with handles 197 for being gripped by the operator, so that it is possible for the operator to convey sub-pallet 3 between the units without using sub-pallet conveyor system 9, 27. This is useful in the case of a machining facility not provided with sub-pallet conveyor system 9, 27 and, further, is effective in the case where sub-pallet conveyor system 9, 27 breaks down.

Further, both when mounting sub-pallet 3 to rotary table 61 on table 59 of machine tool 13 of the vertical machining center and when mounting sub-pallet 3 on rotary table 163 of cleaning station 25, a combination of male side positioning clamp pins 189 and female side positioning clamps 191 is used. Rotary tables 49 and 61 may be NC rotary tables or index tables. Further, the machine tool, one of the units, may be an NC milling machine, lathe, grinding machine, electro-discharge machine, or other type of machine tool.

The invention claimed is:

1. A machining facility having a sub-pallet for a workpiece to be mounted thereon and conveying the sub-pallet between units provided with sub-pallet carrying parts, said machining facility comprising:

at least one machine tool having a pallet changer for changing main pallets;

a plurality of sub-pallets for a workpiece to be mounted thereon, formed to be able to be mounted on a sub-pallet carrying part provided on said main pallet;

a setup station for mounting and dismounting a workpiece on and from said sub-pallet, said setup station having a sub-pallet carrying part for carrying said sub-pallet thereon;

a sub-pallet stocker having a sub-pallet carrying part for carrying said sub-pallet thereon and configured to stock said sub-pallet at a slant so that chips and coolant solution will drop off when said sub-pallet is carried on said sub-pallet stocker; and a sub-pallet conveyor system for conveying said sub-pallet, said sub-pallet conveyor system having a hand for gripping said sub-pallet and configured to include said sub-pallet carrying parts of said machine tool, said setup station and said sub-pallet stocker in a workable area thereof, wherein said sub-pallet is used to convey and machine a workpiece.

2. The machining facility according to claim 1, wherein said sub-pallet conveyor system comprises a multi-articulated conveyor system having at least five swiveling axes.

3. The machining facility according to claim 1, wherein said setup station has a sub-pallet carrying part for carrying said sub-pallet thereon with a workpiece mounting surface of said sub-pallet facing upward, and wherein said machine tool has a sub-pallet carrying part for carrying said sub-pallet thereon with the workpiece mounting surface of said sub-pallet facing sideways.

4. The machining facility according to claim 1, wherein
said unit provided with said sub-pallet carrying part has a reference mark of known relative position coordinates with respect to said sub-pallet carrying part of said unit, and said sub-pallet conveyor system has an image recognizing means for recognizing an image of said reference mark, so that the recognized image of the reference mark and a position information of said sub-pallet conveyor system is used to position a gripper of said sub-pallet conveyor system and said sub-pallet carrying part of said unit.

5. The machining facility according to claim 1, wherein said sub-pallet conveyor system has a weight measuring means for measuring a weight of a gripped article or a shape measuring means for measuring a shape of a gripped article, so that the result of measurement of the weight or shape is compared with predetermined numerical values to judge that mistaken mounting of the workpiece has been made.

6. The machining facility according to claim 1, further comprising a cleaning tool for removing chips and coolant solution attached on said sub-pallet and said workpiece, said cleaning tool having a gripped part gripped by a gripper of said sub-pallet conveyor system.

7. A machining facility having a sub-pallet for a workpiece to be mounted thereon and conveying the sub-pallet between units provided with sub-pallet carrying parts, said machining facility comprising:

at least one machine tool having a pallet changer for changing main pallets;

a plurality of sub-pallets for a workpiece to be mounted thereon, formed to be able to be mounted on a sub-pallet carrying part provided on said main pallet;

a setup station for mounting and dismounting a workpiece on and from said sub-pallet, said setup station having a sub-pallet carrying part for carrying said sub-pallet thereon;

a sub-pallet stocker having a sub-pallet carrying part for carrying said sub-pallet thereon and configured to stock said sub-pallet at a slant so that chips and coolant solution will drop off when said sub-pallet is carried on said sub-pallet stocker; and a sub-pallet conveyor system for conveying said sub-pallet, said sub-pallet conveyor system having a hand for gripping said sub-pallet and configured to include said sub-pallet carrying parts of said machine tool and said sub-pallet stocker in a workable area thereof, wherein said sub-pallet is used to convey and machine a workpiece.

8. A machining facility having a sub-pallet for a workpiece to be mounted thereon and conveying the sub-pallet between units provided with sub-pallet carrying parts, said machining facility comprising:

at least one machine tool including a base supporting machine components, a spindle having a tool mounted thereon, a spindle head rotatably supporting said spindle, a main pallet provided with a sub-pallet carrying part for carrying thereon a sub-pallet for a workpiece to be mounted thereon, a pallet changer for changing main pallets between a machining area and a machining preparation area, a driving means for relatively moving said spindle head along X-, Y-, and Z-axes with respect to said main pallet, and a detecting means for detecting positions or movement amounts of feed axes operated by said driving means;

a plurality of sub-pallets for a workpiece to be mounted thereon, formed to be able to be carried on a sub-pallet carrying part provided on said main pallet or a table of said machine tool;

a setup station for mounting and dismounting a workpiece on and from said sub-pallet, said setup station having a sub-pallet carrying part for carrying said sub-pallet thereon;

a sub-pallet stocker including a sub-pallet carrying table having a sub-pallet carrying part for carrying said sub-pallet thereon, a positioning means provided on said sub-pallet carrying table and engaging with and positioning said sub-pallet, and an oil pan for receiving dropped chips and coolant solution; and a sub-pallet conveyor system for conveying said sub-pallet between said units, said sub-pallet conveyor system configured to include said sub-pallet carrying parts of said machine tool, said setup station and said sub-pallet stocker in a workable area thereof, wherein said sub-pallet is used to convey and machine a workpiece.

9. A machining facility having a sub-pallet for a workpiece to be mounted thereon and conveying the sub-pallet between units provided with sub-pallet carrying parts, said machining facility comprising:

at least one machine tool having a pallet changer for changing main pallets;

a plurality of sub-pallets for a workpiece to be mounted thereon, formed to be able to be mounted on a sub-pallet carrying part provided on said main pallet;

a setup station for mounting and dismounting a workpiece on and from said sub-pallet, said setup station having a sub-pallet carrying part for carrying said sub-pallet thereon;

a sub-pallet stocker having a sub-pallet carrying part for carrying said sub-pallet thereon;

a cleaning station for removing chips and coolant solution attached on said sub-pallet and said workpiece, said cleaning station having a sub-pallet carrying part for carrying said sub-pallet thereon and including a sub-pallet swiveling mechanism for making said sub-pallet turn; and a sub-pallet conveyor system for conveying sub-pallet and driving said swiveling mechanism of said cleaning station, said sub-pallet conveyor system having a hand for gripping said sub-pallet and configured to include said sub-pallet carrying parts of said machine tool, said setup station, said sub-pallet stocker and said cleaning station in a workable area thereof, wherein said sub-pallet is used to convey and machine a workpiece.

10. A machining facility having a sub-pallet for a workpiece to be mounted thereon and conveying the sub-pallet between units provided with sub-pallet carrying parts, said machining facility comprising:

at least one machine tool including a base supporting machine components, a spindle having a tool mounted thereon, a spindle head rotatably supporting said spindle, a main pallet or table provided with a sub-pallet carrying part for carrying thereon a sub-pallet for a workpiece to be mounted thereon, a driving means for relatively moving said spindle head along X-, Y-, and Z-axes with respect to said main pallet or said table, and a detecting means for detecting positions or movement amounts of feed axes operated by said driving means;

a plurality of sub-pallets for a workpiece to be mounted thereon, formed to be able to be carried on a sub-pallet carrying part provided on said main pallet or said table of said machine tool;

a setup station for mounting and dismounting a workpiece on and from said sub-pallet, said setup station having a sub-pallet carrying part for carrying said sub-pallet thereon;

a sub-pallet stocker including a sub-pallet carrying table having a sub-pallet carrying part for carrying said sub-pallet thereon, a positioning means provided on said sub-pallet carrying table and engaging with and positioning said sub-pallet, and an oil pan for receiving dropped chips and coolant solution; and a multi-articulated sub-pallet conveyor system for conveying said sub-pallet between said units, said sub-pallet conveyor system having at least five swiveling axes and configured to include said sub-pallet carrying parts of said machine tool, said setup station and said sub-pallet stocker in a workable area thereof, wherein said sub-pallet is used to convey and machine a workpiece.

* * * * *